(No Model.)

L. G. ENGEL.
VALVE.

No. 322,270. Patented July 14, 1885.

WITNESSES:
E. C. Koch
Geo. C. Hollerith

INVENTOR:
Louis G. Engel
by H. Hollerith Atty

UNITED STATES PATENT OFFICE.

LOUIS G. ENGEL, OF TILLY FOSTER, NEW YORK.

VALVE.

SPECIFICATION forming part of Letters Patent No. 322,270, dated July 14, 1885.

Application filed May 6, 1884. (No model.)

*To all whom it may concern:*

Be it known that I, LOUIS G. ENGEL, a citizen of the United States, residing at Tilly Foster, in the county of Putnam and State of New York, have invented certain new and useful Improvements in Valves, of which the following, in connection with the accompanying drawings, is a specification.

My invention relates to improvements in valves, and is more especially applicable to disk-valves of rubber or other suitable material—such, for example, as are used in the ordinary forms of steam-pumps. Disk-valves as ordinarily constructed will lift at each stroke of the pump and be seated with considerable force in exactly the same position. The grid forming the seat of the valve will thus wear the disk of rubber or other soft material unequally and cause considerable loss in the efficiency of the pump and necessitate frequent renewal of the valve-disk.

The object of my invention is to provide a simple and effective device for rotating the valve slightly at each lift, thus seating the valve in a different position each time, and thereby securing even wear on the face of the valve-disk. I attain these objects by the use of the mechanism illustrated in the accompanying drawings, in which—

Figure 1:
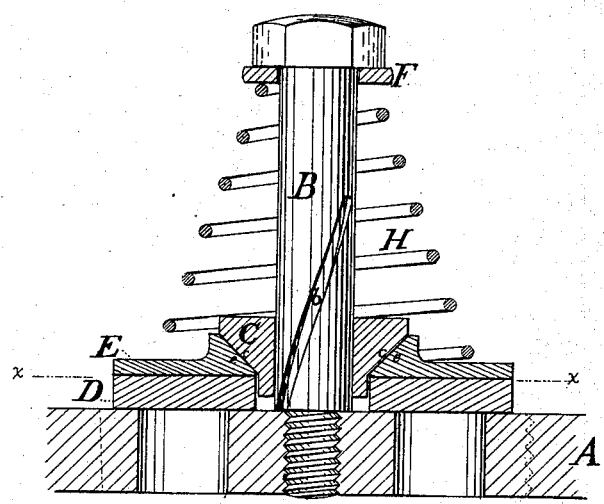
Figure 2:
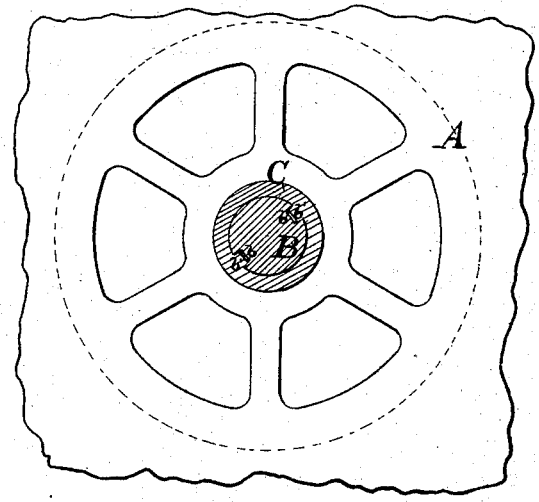

Figure 1 represents a vertical central section through valve with its rotating device and valve-seat. Fig. 2 shows a plan view of the valve-seat, part being in section along line $x\ x$, Fig. 1, the valve itself being removed.

In the drawings, at A is shown the grid forming the ordinary valve-seat, which can be made either directly in valve-plate or as a separate removable piece fitting along a ground joint or by screw-thread, as shown by dotted lines. From the center of this grid is supported the valve-stem B, secured by screw-thread at its lower end, and provided with a bolt-head for its easy removal. The valve-stem is provided with one or more spiral grooves, $b$, forming a rifle-bar having a very long thread. Around this valve-stem fits the conical nut C, having an internal spiral thread, $b'$, Fig. 2, corresponding to the groove $b$ in valve-stem B. The conical nut C can move up and down freely on stem B, and will be guided by the spiral groove $b$. The rubber or other suitable disk, D, forming the valve, is backed by the metallic plate E, having conical seat $e$ fitting conical surface $c$ of nut C.

The valve D is held to its seat by spiral spring H, pressing against the metallic plate E. The upper end of the spring presses against the washer F, which allows the same to revolve easily.

When the water forces the valve upward, the plate E along the conical seat $e$ jams against the cone $c$ of nut C and rotates with it. As soon as the reflux begins, the plate E, due to spring H, falls away from the nut C, and the valve seats itself in a different position. The nut C, fitting loosely around stem B, follows the plate E by its weight along spiral groove $b$, and will at the next lift of the valve again rotate the same. At each stroke of the pump the valve will thus be rotated slightly. The valve will thus seat in a different position each time, and thereby cause it to wear evenly.

I have shown the angle of the cone $c$ as about forty-five degrees. This of course can be made more or less, according to circumstances. Likewise the pitch of the thread or groove $b$ can be varied within considerable limits. If desired, the thread or groove can be cut in nut C, and corresponding projecting rib formed on stem B.

I have shown the valve as formed of two parts, the rubber disk D backed by metal plate E. When using suitable material, the valve can of course be formed in one piece having the conical seat $e$. The weight of the cone $c$ can be regulated by its size.

What I claim as new, and desire to secure by Letters Patent, is—

1. The combination, with a valve, of a nut or disk having spiral guides, said nut being free to move vertically along said spiral guides and placed above and resting on said valve, substantially as and for the purposes described.

2. The combination, with a valve, of a fixed valve-stem provided with spiral guides, and a nut placed above said valve engaging with said spiral guides, along which it is free to move vertically, substantially as and for the purpose described.

3. The combination, with the valve-stem B, having spiral groove $b$, of a conical nut, C, having internal thread, $b'$, valve D E, and spring H, substantially as and for the purpose specified.

LOUIS G. ENGEL.

Witnesses:
H. HOLLERITH,
S. G. METCALF.